United States Patent [19]

Okamoto et al.

[11] Patent Number: 5,034,871
[45] Date of Patent: Jul. 23, 1991

[54] DC TO DC CONVERTER WITH STEADY CONTROL OF OUTPUT DC VOLTAGE BY MONITORING OUTPUT DC CURRENT

[75] Inventors: Toyokatsu Okamoto; Sumio Wada, both of Hikone, Japan

[73] Assignee: Matsushita Electric Works, Ltd., Japan

[21] Appl. No.: 498,644

[22] Filed: Mar. 26, 1990

[30] Foreign Application Priority Data

Mar. 28, 1989 [JP] Japan ................................ 1-75823

[51] Int. Cl.⁵ .......................................... H02M 3/335
[52] U.S. Cl. ......................................... 363/15; 363/21; 363/97; 363/131
[58] Field of Search ..................... 363/15, 16, 20, 21, 363/24, 25, 26, 97, 131, 134

[56] References Cited

U.S. PATENT DOCUMENTS

| | | | |
|---|---|---|---|
| 4,172,277 | 10/1979 | Pinson | 363/21 |
| 4,276,587 | 6/1981 | Koizumi | 363/26 |
| 4,322,817 | 3/1982 | Kuster | 363/26 |
| 4,439,821 | 3/1984 | Grippe | 363/97 |
| 4,683,528 | 7/1987 | Snow et al. | 363/21 |
| 4,890,214 | 12/1989 | Yamamoto | 363/25 |

FOREIGN PATENT DOCUMENTS

| | | |
|---|---|---|
| 62-26264 | 6/1987 | Japan . |
| 62-29995 | 6/1987 | Japan . |
| 120767 | 4/1989 | Japan . |

Primary Examiner—Steven L. Stephan
Assistant Examiner—Jeffrey Sterrett
Attorney, Agent, or Firm—Stevens, Davis, Miller & Mosher

[57] ABSTRACT

A constant dc current supplying circuit comprises a dc voltage supply, an inverter providing an ac voltage from said dc voltage, and an ac-to-dc converter providing a dc current from the inverter output and supplying the resulting dc current to a load. The inverter includes a switching element driven to turn on and off in order to repetitively interrupt the dc voltage for producing the dc current of which level is determined by on-off time ratio of the switching element. A comparator is included to compare a level of the dc current supplied to the load with a predetermined reference level so as to provide a first output and a second output when the dc current level is below and above the reference level. Also included in the circuit is a feedback controller which generates first and second feedback control signals, respectively in response to the first and second outputs from the comparator. The first and second control signals are defined as a train of pulses of varying duty ratio in order to increase and decrease on-off time ratio of the switching element depending upon the sensed output dc current level, whereby controlling to gradually increase and decrease the output dc current towards the reference level for maintaining the dc current thereat.

2 Claims, 6 Drawing Sheets

Fig. 3
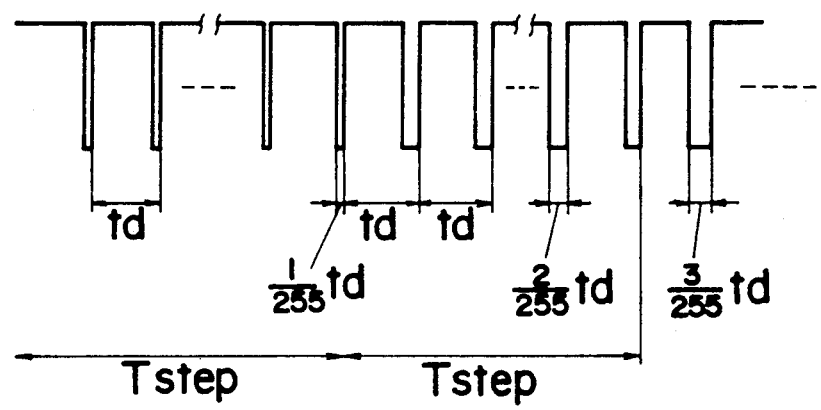
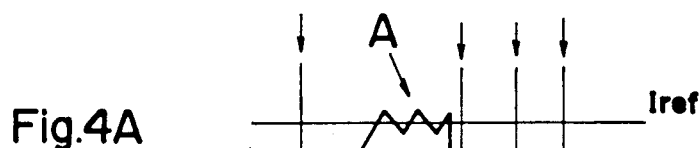
Fig. 4A
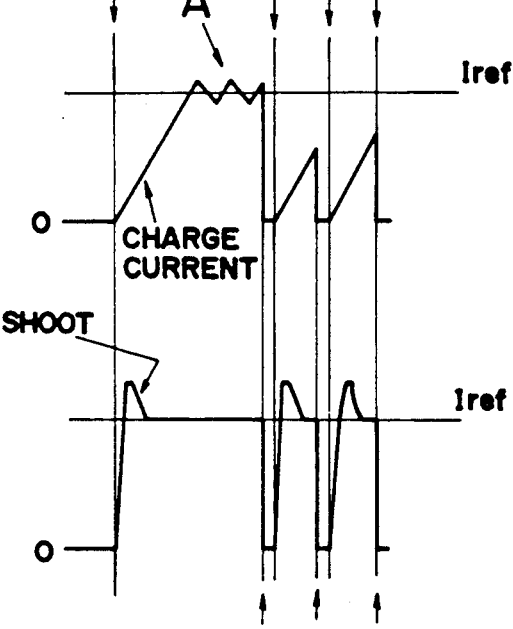
Fig. 4B

DC TO DC CONVERTER WITH STEADY CONTROL OF OUTPUT DC VOLTAGE BY MONITORING OUTPUT DC CURRENT

BACKGROUND OF THE INVENTION

1. Field of the Invention

The present invention is directed to a constant dc current supplying circuit, and more particular to such a circuit including an inverter of which output is rectified to provide an output dc current and in which a switching element is driven to repetitively interrupt an input dc voltage of the inverter at varying duty ratios in a feedback manner by monitoring the dc current so as to increase and decrease the output dc current to a constant level.

2. Description of the Prior Art

In prior art, dc current supplying circuits including an inverter and a rectifier which provides an output dc current from an inverter output to a load, a feedback control is generally utilized to sense the output dc current for controlling the inverter to supply substantially constant dc current to the load. The inverter includes a switching element or transistor which is controlled by a controller normally by a PWM controller to switch the inverter input voltage at differing duty ratios in order to increase and decrease the dc current in response to the level of the sensed dc current for maintaining the output dc current at a constant level. For feedback control of the output dc current, the prior circuit is designed to include a differential amplifier producing an output signal that is a function of the difference between the sensed dc current level and a threshold level. The output signal, which is an analog signal, is directly fed back to the PWM controller for controlling the switching element of the inverter so as to produce the output dc current of a constant level. In order to prevent overshooting of the output dc current at the start of the dc current supplying circuit, the prior circuit is configured to have a delay or soft-start circuit which inhibits the operation of the PWM controller or the inverter for a limited time period immediately after the start of the dc current supply circuit. The delay circuit includes a capacitor which is charged by the common input voltage to the inverter and is connected to the inverter controller or PWM controller such that it enables inverter controller to drive the inverter in a feedback manner only after the capacitor is charged up to a certain level, whereby delaying the operation of the inverter by the limited time required for charging the capacitor. Although such delay circuit relying on the capacitor is successful at the start of operating or energizing the dc current supply circuit, it will not operate properly or fail to prevent the overshooting when the dc current supply circuit is re-energized within a short time interval after deenergizing the circuit or when the load is reconnected to the supply circuit within a short time interval after being disconnected from the circuit. This is because that, within such short interval, the capacitor is kept in a charged condition such that the inverter controller is still enabled to or ready to control the inverter in a feedback manner in prompt response to the sensed output dc current. Because the output dc current is sensed to be of zero level at a very moment of reenergizing the circuit or reconnecting the battery, the feedback control will be over-responsive to such zero current level to drive the inverter in the direction of rapidly increasing the output dc current and therefore causing the overshooting. At this overshooting condition, the switching element of the inverter will suffer from an excessive stress and may be damaged eventually after receiving repeated stresses. Therefore, the overshooting should be avoided in the dc current supplying circuit for protecting the switching element of the inverter and for providing reliable feedback control over an extended period of use.

SUMMARY OF THE INVENTION

The above problem is eliminated in the present invention which provides a constant dc current supplying circuit with a unique and novel feedback control. The circuit comprises a dc voltage source, inverter providing an ac voltage from the dc voltage source, and an ac-to-dc converter providing an output dc current to a load from an inverter output. The inverter includes a switching element which is controlled to turn on and off at varying duty ratios for repetitively interrupting the dc voltage in order to provide the ac voltage of a level proportional to on-off time ratio of the switching element. The ac voltage from the inverter is rectified and smoothed at the ac-to-dc converter to provide the dc current to be supplied to the load. A current sensor is included to monitor the dc current being supplied to the load. The monitored dc current is compared with a predetermined reference level at a comparator which provides a first output when the monitored dc current has a level less than the reference level and a second output when the monitored dc current has a level exceeding the reference level. Control means is included in the circuit which responds to the first and second outputs to provide first and second feedback control signals, respectively. The first feedback control signal is configured to be a train of pulses having increasing duty ratio so as to correspondingly increase the on-off time ratio of the switching element of the inverter for controlling to gradually increase the output dc current to the reference. While on the other hand, the second feedback control signal is defined as a train of pulses having decreasing duty ratio so as to correspondingly decrease the on-off time ratio of the switching element of the inverter for controlling to gradually decrease the output dc current to the reference level. Consequently, it is possible to control the switching element of the inverter to increase and decrease the output dc current level in a delayed response to the output dc current being monitored by a time interval enough to avoid the overshooting of the output dc current not only at the start of energizing the circuit but also at the time of re-energizing the circuit or reconnecting the load to the circuit within a short time interval after deenergizing the circuit or disconnecting the load from the circuit. Therefore, the dc current supplying circuit of the present invention is found most effective to prevent the switching element from receiving undue stress which may develop when the overshooting occurs and could damage the switching element. Since the above situation of reenergizing the circuit or reconnecting the load to the circuit within a short time after deenergizing the circuit or disconnecting the load to the circuit is likely in an actual use of the circuit as seen in a case when a person not familiar to the circuit attempts to quickly disconnect and connect the circuit from and to a power source or the load from and to the circuit, the feedback control of the present invention is particularly advantageous in protecting the switching element of the inverter even when the circuit is utilized in the above situation.

Accordingly, it is a primary object of the present invention to provide a constant dc current supplying circuit which is capable of eliminating the overshooting of the output dc current and therefore of protecting the switching element of the inverter even when the circuit is reenergized, the load is reconnected to the circuit within a short time interval after the circuit is deenergized or the load is disconnected from the circuit.

In a preferred embodiment, the control means comprises a feedback controller, an integrator circuit, and a PWM controller. The feedback controller generates the train of first feedback control pulses of increasing duty and the train of second feedback control pulses of decreasing duty, respectively in response to the first and second output from the comparator, i.e., in response to the monitored output dc current being of a level less than and exceeding the reference level. The integrator circuit is provided to integrate the first and second feedback control pulses into corresponding first and second analog signals of increasing and decreasing level, respectively. The PWM controller is connected in circuit to receive the first and second analog signals and to drive the switching element of the inverter at varying duty ratio in proportion to level of the first and second analog signals. Therefore, the inverter can be controlled in a desired delayed fashion by suitably selecting the increment and decrement of the duty ratio for the first and second feedback control signals, yet using the PWM controller having the analog input for driving the switching element of the inverter is therefore another object of the present invention.

The first and second feedback control pulses are each defined to comprise repeating units of pulses occurring for a predetermined period of time. The width of pulses is set to be equal within each unit of pulses but is set to be increasing and decreasing in a stepwise manner as the units repeats in order to vary the duty ratio of the first and second feedback pulses in increasing and decreasing manner, respectively. In other words, the pulses of the same width are repeated prior to increasing and decreasing the pulse width or the pulse duty of the first and second feedback control pulses. Therefore, an amount of the delay in controlling the inverter based upon the monitored output dc current can be easily chosen by suitably selecting the period of time during which the pulses of the same width repeat, which is therefore a further object of the present invention.

In a preferred feedback control, the feedback controller issues a train of the first feedback control pulses in which the pulses of the same width repeat for a first period of time until the output dc current reaches the reference level. Once the output dc current exceeds the reference level, the feedback controller issues a train of the second feedback control pulses in which the pulses of the same width repeats for a shortened second period of time, thereby controlling the output dc current to increase and decrease to the reference level at a relatively fast rate for maintaining the output dc current substantially at a constant level while reducing the ripple of the output current to a minimum.

It is therefore a still further object of the present invention to provide a constant dc current supplying circuit which is capable of raising a feedback response sensitivity once the output dc current reaches the reference level for stably maintaining the output dc current at the reference level with reduced ripples.

These and still other objects and advantages of the present invention will become more apparent from the following description of the preferred embodiment when taken in conjunction with the attached drawings.

BRIEF DESCRIPTION OF THE DRAWINGS

FIG. 3 is a schematic diagram of a waveform illustrating a train of feedback control pulses issued from a feedback controller of the circuit;

FIG. 4A is a diagram illustrating a charge current controlled in accordance with the present invention;

FIG. 4B is a diagram similar to FIG. 4A but illustrating a charge current in the absence of the feedback control of the present invention;

DESCRIPTION OF THE PREFERRED EMBODIMENT

Figure 1:
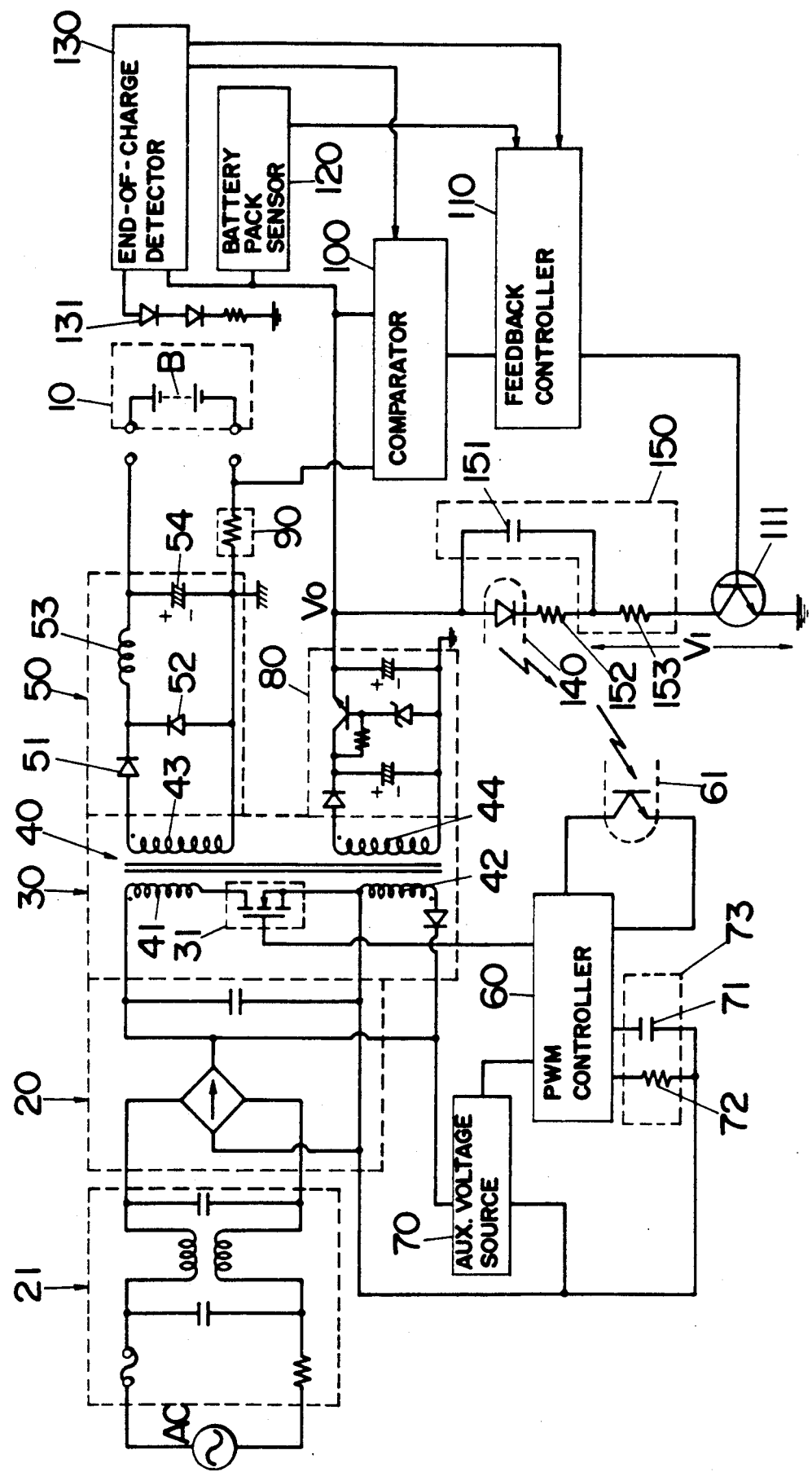
FIG. 1 is a circuit diagram of a battery charging circuit embodying the present invention.

Referring now to FIG. 1, there is shown a battery charging circuit embodying a constant dc current supplying circuit in accordance with a preferred embodiment of the present invention. The battery charging circuit is configured to provide an output dc current from a commercial ac voltage source AC for charging a battery B which is encapsulated in a battery pack 10 detachable to a charger (not shown) incorporating the charging circuit. The Charging circuit comprises an ac-to-dc converter 20, an inverter 30, and an dc-to-ac converter 50 providing a charging current to the battery B. The ac voltage from the source AC is fed through a line filter 21 to the ac-to-dc converter 20 where it is rectified to provide a dc voltage to the inverter 30. The inverter 30 comprises a transformer 40 having a primary winding 41 and three secondary windings 42, 43, and 44 providing independent voltage sources. Also included in the inverter 30 is a switching element 31 which is a MOSFET connected in series with the primary winding 31 so as to repetitively interrupt the dc voltage from the converter 20 for generating corresponding ac voltages across the individual secondary windings 42, 43, and 44. The ac voltage output from the secondary winding 43 is fed to the ac-to-dc converter 50 where is rectified and smoothed by a circuit of diodes 51, 52, an inductor 53, and a capacitor 54 to provide the dc current or charge current for charging the battery B.

The switching transistor (MOSFET) 31 is connected at its gate to a PWM (pulse-Width-modulatiOn) controller 60 so that it is driven thereby to turn on and off at varying duty ratios in order to correspondingly increase and decrease the resulting charge current. To this end, the PWM controller 60 generates a control signal comprising a train of pulses of which width will vary depending upon a level of analog signal input to the PWM controller 60 and determine the duty ratio or on-off time ratio of the MOSFET 31. The PWM controller 60 is powered by an auxiliary voltage source 70 which in turn receives the voltage developed across the secondary winding 42.

A soft start circuit 73 composed of a capacitor 71 and a resistor 72 is connected to a control terminal of the PWM controller 60 such that the PWM controller 60 generates a train of control pulses of which width is gradually increased from zero toward a target value determined by the level of the input signal as the capacitor 71 is charged by the source 70 up to a predetermined level, whereby operating MOSFET 31 in a delayed manner at the start of energizing the charging circuit, or connecting the circuit to the ac voltage source AC. Once the capacitor 71 is charged up, the PWM controller 61 is fully responsive to the input signal to provide a train of pulses of which width is in exact coincidence with the level of the input signal. As will be discussed later, the above soft-start circuit 73 is not essential in the present invention and can be eliminated without causing no substantial disadvantages.

The remaining secondary winding 44 is connected to an additional ac-to-dc converter 80 which provides a constant dc voltage $V_0$ for operation of a comparator 100, a feedback controller 110, a battery pack sensor 120, and an end-of-charge detector 130. A current sensor 90 is inserted in a charge current path from the ac-to-dc converter 50 to the battery B in order to sense the voltage drop thereat as representative of the level of the charge current being supplied to the battery B. The sensed voltage vs is compared at the comparator 100 with a reference voltage $V_{ref}$ corresponding to a predetermined current level $I_{ref}$. In response to the result at the comparator 100, the feedback controller 110 issues a feedback control signal in the form of a pulse train which is converted into a corresponding analog signal and is fed back to the PWM controller 60 for driving the inverter 130 in order to maintain the charge current at a constant level $I_{ref}$ determined by the reference voltage $V_{ref}$.

The pack sensor 120 is provided to issue an enable signal when the battery pack 10 is attached to the charger, i.e., coupled to the charging circuit and to issue a disable signal when the battery pack 10 is detached from the charter, i.e., disconnected from the circuit. The feedback controller 110 responds respectively to the enable signal and disable signal from the pack sensor 120 to immediately stop producing the feedback control signal and enable to produce the feedback control signal.

Figure 6:
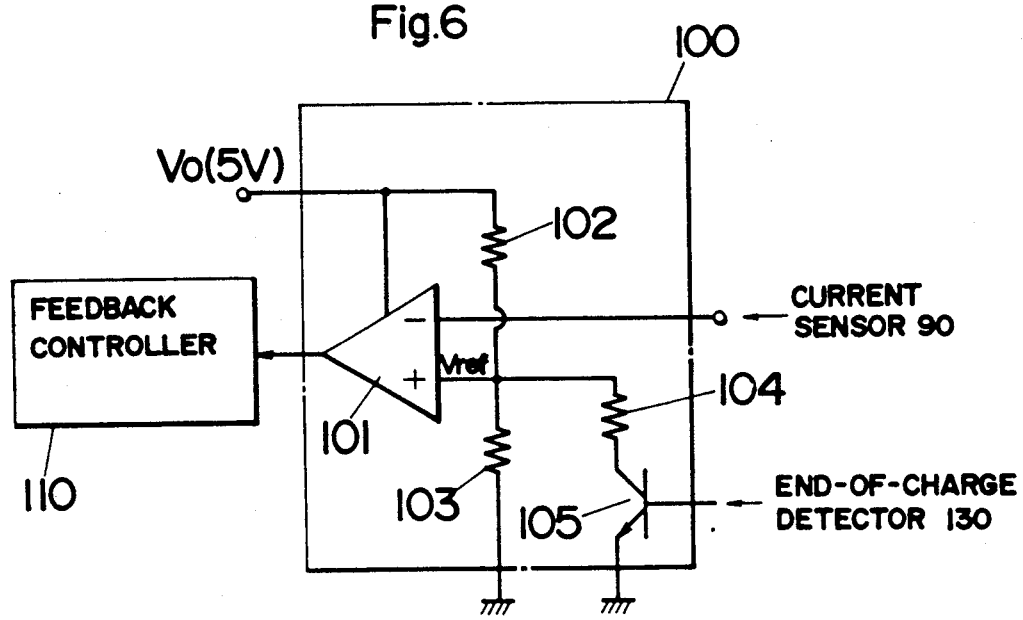
FIG. 6 is a circuit diagram of a comparator utilized in the above circuit.

The end-of-charge detector 130 includes a temperature sensor 131 disposed in proximity to the battery B for sensing the temperature of the battery B being charged. The sensed temperature is processed to determine a temperature gradient which is well indicative of charge condition of the battery B. When the temperature gradient is found to be small enough as indicative of that the battery B is fully charged, the end-of-charger detector 130 provides an output such that the feedback controller 110 operates to produce the charge current at a zero level or trickle charge level. Otherwise, the end-of-charge detector 130 regards that the battery B is not yet fully charged and provides an output such that the feedback controller 110 operates in a normal mode of controlling the charge current. In the present embodiment, the comparator 100 has two reference voltages $V_{ref}$ for comparison with the voltage corresponding to the sensed charge current level, a first reference being selected until the battery B is detected to be fully charged, and second reference being defined to be smaller than the first reference and selected once the battery B is detected to be fully charged. To this end, the comparator 100 is configured, as shown in FIG. 6, to comprise a differential amplifier 101 having an inverted input connected to the current sensor 90 and an non-inverted input connected to a voltage divider network composed of resistors 102, 103, and 104. A transistor 105 is inserted in series with the resistor 104 across the resistor 103 and is connected to the end-of-charge detector 130 such that it is made conductive, in response to the output therefrom indicating that the battery B is fully charged, to give the second reference which is determined by resistors 102, 103, and 104 for comparison with the sensed charge current level or the corresponding voltage. Otherwise or until the battery B is fully charged, the transistor 105 is kept non-conductive to give the first reference which is determined by resistors 102 and 103.

Figure 2:
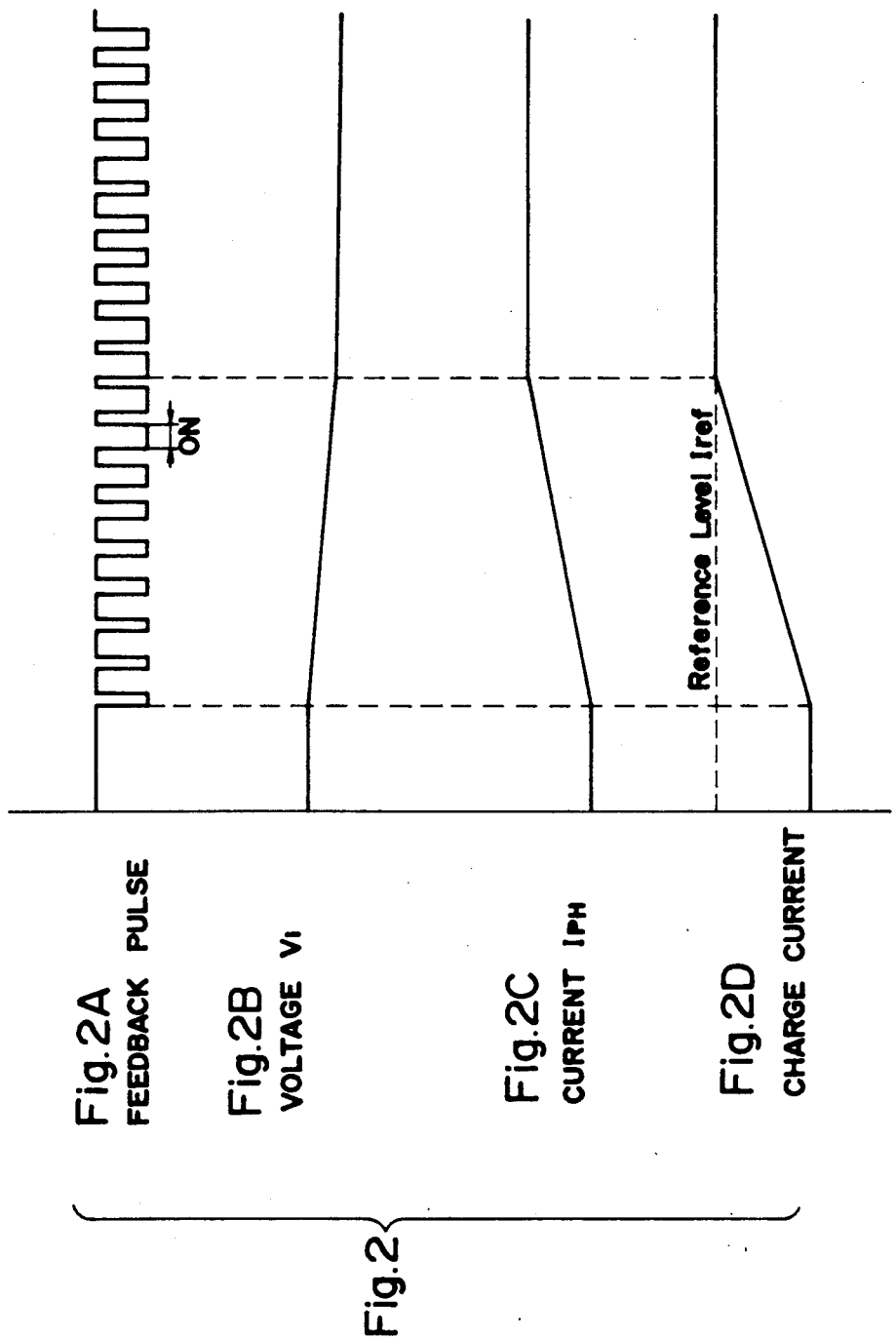
FIG. 2, composed of FIGS. 2A to 2D, is a waveform chart illustrating waveforms at several points in the circuit.

As shown in FIG. 2A and 3, the feedback control signal generated from the feedback controller 110 is defined as a train of rectangular pulses of varying widths which is subsequently converted into a corresponding analog signal of varying levels flowing through a photo-diode 140 from the additional ac-to-dc converter 80. The photo-diode 140 is optically coupled to a photo-detector 61 on the side of the PWM controller 60 to produce the corresponding analog signal flowing through the photo-detector 61 to the control input of the PWM controller 60, thereby controlling MOSFET 31 to switch at varying duty ratios for regulating the charge current fed to the battery B. For conversion of the feedback pulses into the analog signal, an integrator circuit 150 is provided to comprise a capacitor 151 connected across a series combination of the photo-diode 140 and a resistor 152, a resistor 153 connected in series with a transistor 111 and the parallel combination of the capacitor 151 and the photo-diode 140 and resistor 151. The transistor 111 is switched by the feedback pulses from the feedback controller 110 so that the feedback pulses are integrated to develop a voltage $V_1$ at a point shown in the circuit of FIG. 1. In the present embodiment, the transistor 111 is made conductive at L-level and non-conductive at H-level of the feedback pulse. Therefore, as indicated in FIG. 2A, the width of the feedback pulse is defined as the duration of L-level output or the duration of turning on the transistor 111. As seen in FIGS. 2A to 2D, as the on-time width of the feedback pulses increases the voltage $V_1$ decreases correspondingly. Since the current $I_{PH}$ flowing through the photo-diode 140 is in direct proportion to the voltage difference between the output voltage $V_0$ from the additional ac-to-dc converter 80 and the voltage $V_1$, the current flowing through the photo-diode 140 or the analog signal level issued therefrom increases as the voltage $V_1$ drops in response to the increasing pulse width, thereby correspondingly increasing the analog signal flowing through the photo-detector 61 to the control input of the PWM controller 60 and consequently increasing duty ratio of MOSFET 31 and therefore increasing the charge current to the battery B.

The feedback controller 110 is constructed by a microcomputer to produce the above feedback pulse train which comprises, as shown in FIG. 3, repeating unit of pulses. Each unit includes a number of pulses having the same width and occurring at a fixed cycle of time td (for example, 512 micro-seconds) for a fixed duration of time $T_{step}$ (for example 62 milli-second). The pulse width is controlled to vary by an increment or decrement of $1/255 \times td$ in response to the output from the comparator 100. That is, when the charge current level is determined at the comparator 100 to be less than the reference level (i.e., $Vs < V_{ref}$), the feedback controller 110 responds to increase the pulse width by an increment of $1/255 \times td$ in the direction of increasing the charge current. When, on the other hand, when the charge current is found to be greater than the reference level (i.e., $Vs > V_{ref}$), the feedback controller 110 responds to decrease the pulse width by a decrement of $1/255 \times td$ in the direction of decreasing the charge current. It is noted at this time that the pulses of the same width will repeat for a fixed duration of time $T_{step}$ so that the pulse width will not be incremented or decremented until the pulses repeat for the full period of $T_{step}$.

Prior to discussing the operation of the charging circuit, it is noted that the PWM controller 60 is designed to drive MOSFET 31 at such a minimum duty ratio as required to only develop at the additional ac-to-dc converter 80 a stabilized output voltage $V_0$ (i.e., 5V) when there is no current flowing through the photo-detector 61 to the control input of the PWM controller 60. In operation, during a short time period immediately after the charging circuit is connected to the ac power source AC or energized thereby, the feedback controller 110 is kept inoperative to produce no active control signal fed back to the PWM controller 60 until the additional ac-to-dc converter 80 becomes stabilized to provide the constant voltage $V_0$. That is, the transistor 111 is kept non-conductive to flow no current through the photo-detector 140, thereby producing no significant feedback signal to the PWM controller 60. Once the additional ac-to-dc converter 80 becomes providing the stabilized voltage $V_0$, the feedback controller 110 is ready to start a control loop as illustrated in the flow chart of FIG. 5, while at the same time the comparator 100, the pack sensor 120 and the end-of-charge detector 130 become active, respectively. In the first step, the feedcontroller 110 sets pulse duty D or pulse width of the feedback pulse to be zero (D=0) and generates a train of the feedback pulses of zero duty for a period of time $T_{step}$ (=62 mil-seconds) and increase the pulse duty D by an increment of $1/255 \times td$ for increasing the charge current gradually. This routine will repeat so long as the battery pack 10 is attached and until the sensed charge current level, or the corresponding voltage $V_s$ exceeds the reference voltage $V_{ref}$ ($Vs > V_{ref}$). When the battery pack 10 is disconnected, the controller 110 is reset to restart the routine with the pulse duty D=0. When the sensed charge current level, i.e., the corresponding voltage $V_s$ exceeds the reference voltage $V_{ref}$ in the above loop, the controller 110 responds to decrease the pulse duty D or pulse width by a decrement of $1/255 \times td$ in the direction of decreasing the charge current after repeating to provide the pulses having the previous pulse duty D for the fixed time period of $T_{step}$. In this manner, the charge current can be controlled to have a substantially fixed level determined by the reference voltage $V_{ref}$ as repeating to increase and decrease toward that reference level by an extent corresponding to the pulse width of $1/255 \times td$, as illustrated at a portion A in FIG. 4A. It should be noted at this time that since the controller 110 provides no feedback to the PWM controller 60 for a short time immediately after the start of energizing the charging circuit and since the pulse duty D will increase from zero toward an optimum value in a stepwise manner through repeating to generate a number of pulses having less pulse width, the charge current can be increased to the reference level gradually or in such a delayed fashion as to prevent overshooting of the charge current or generating a temporarily excess charge current in over-response to the sensed charge current, whereby enabling to effect the soft start operation with this arrangement. In this sense, the soft-start circuit 73 on the side of the PWM controller 60 can be eliminated from the circuit of the present invention without causing any undesirable problem. FIG. 4B is presented to illustrate a charge current generated by a circuit having neither of the soft-start circuit 73 nor the above feedback control arrangement for easy comparison with FIG. 4A which illustrates the characteristics of the charge current generated by the charging circuit of the present invention. From comparison between FIGS. 4A and 4B, t is easily understood that the charge current generated in the circuit of the present invention (FIG. 4A) will increase rather gradually toward the reference level $I_{ref}$ without causing any remarkable overshooting which is seen at the start of providing the charge current of FIG. 4B.

It is also noted that even after the charge current reaches the reference level the feedback controller 110 repeats to increase and decrease the pulse width stepwise by $1/255 \times td$, thereby continuously varying the level of the analog signal input to the PWM controller 60 and therefore constantly varying on-duty of MOSFET 31. Although the variation in on-duty of MOSFET 31 of the inverter 30 is within a limited range, it can certainly diffuse the switching frequency of MOSFET 31 within a limited frequency range to thereby render the frequency noise rather as white noise exhibiting reduced peak values, which facilitates to suppress the leakage of frequency noise occurring at MOSFET 31 back to the ac voltage source AC.

When the battery pack 10 is detached from the charger or disconnected from the charging circuit, the feedback controller 110 responds to the output from the pack sensor 120 to be immediately rendered inoperative providing no substantial feedback pulse, thereby stop generating the charge current to the battery B. When the battery back 10 is again attached to the charger, the feedback controller 110 responds to increase the pulse width or pulse duty D again from zero to the target value stepwise in such a manner to gradually increase the charge current toward the reference level $I_{ref}$. Accordingly, even when the battery pack 10 is attached immediately after being detached from the charger as may be likely in the actual use of the charger, the charge current will see no overshooting, as seen in FIG. 4A which is in contrast to FIG. 4B where the overshooting is inevitable as a consequence of that the inverter operates to increase the charge current in quick response to the feedback signal with the prior charging circuit lacking the unique feedback control of the present invention. This is particularly advantageous in protecting MOSFET 31 from receiving excess stress which may develop at the time of overshooting and eventually break MOSFET 31. Further, since the overshooting can be well prevented in the charging circuit of the present invention, there is no chance to multiply the overshooting voltage which would otherwise occur due to a reverse voltage develop at the transformer 40 when the battery pack 10 is detached at a very moment of the overshooting and which would act across the source-drain path of MOSFET 31, whereby protecting MOSFET 31 harmless.

Figure 7:
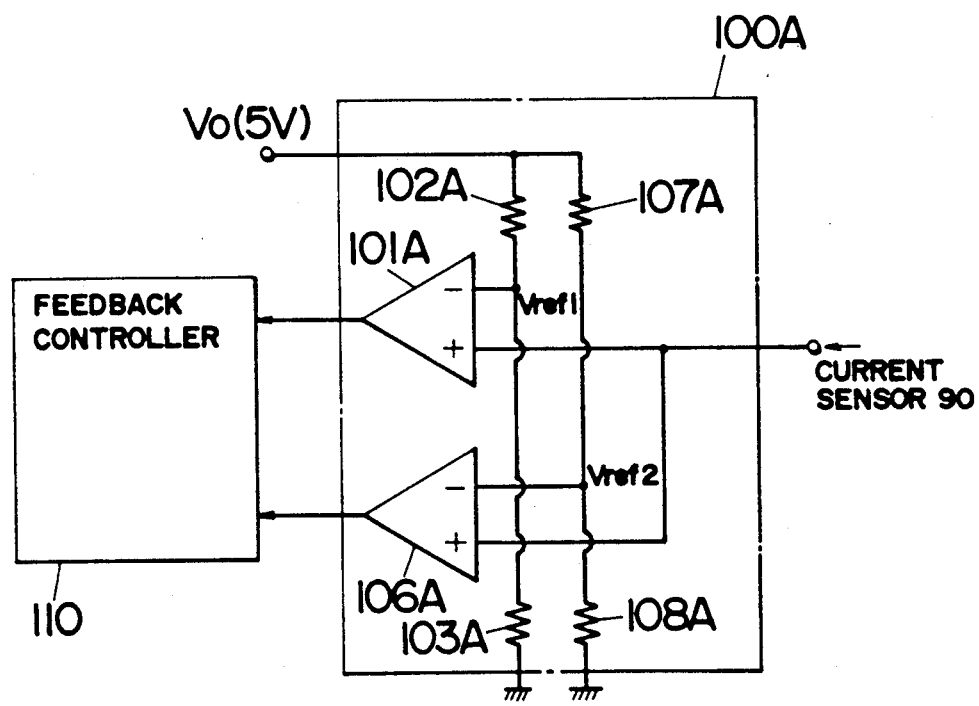
FIG. 7 is a circuit diagram of another comparator which may be utilized in the circuit of the present invention.

FIG. 7 illustrates a comparator 100A of modified configuration which may be utilized in place of the comparator 100 of the above embodiment. The modified comparator 100A is designed to prevent the circuit from supplying an excessive charge current to the battery which might occur due to a possible noise or other environmental factors. For this purpose, the comparator 100A includes, in addition to a first reference voltage $V_{ref1}$ for regulation of the charge current, a second reference voltage $V_{ref2}$ which is higher than $V_{ref1}$ for discriminating the excessive current. In circuit, the comparator 100A includes a pair of differential amplifiers 101A and 106A which are connected at individual inverted inputs respectively to a resistor network of 102A and 103A and a resistor network of 107A and 108A to determine the reference voltages $V_{ref1}$ and $V_{ref2}$. The other inputs of the individual amplifiers 101A and 106A are commonly connected to receive an output from the current sensor 90 such that, when the overcurrent condition is sensed to have an input voltage greater than $V_{ref2}$, the amplifier 106A provides a reset signal to the feedback controller 110 so as to immediately stop generating the feedback control signal and restart to increase the pulse width from zero toward a target value corresponding to the desired constant charge current level defined by $V_{ref1}$.

Figure 5:
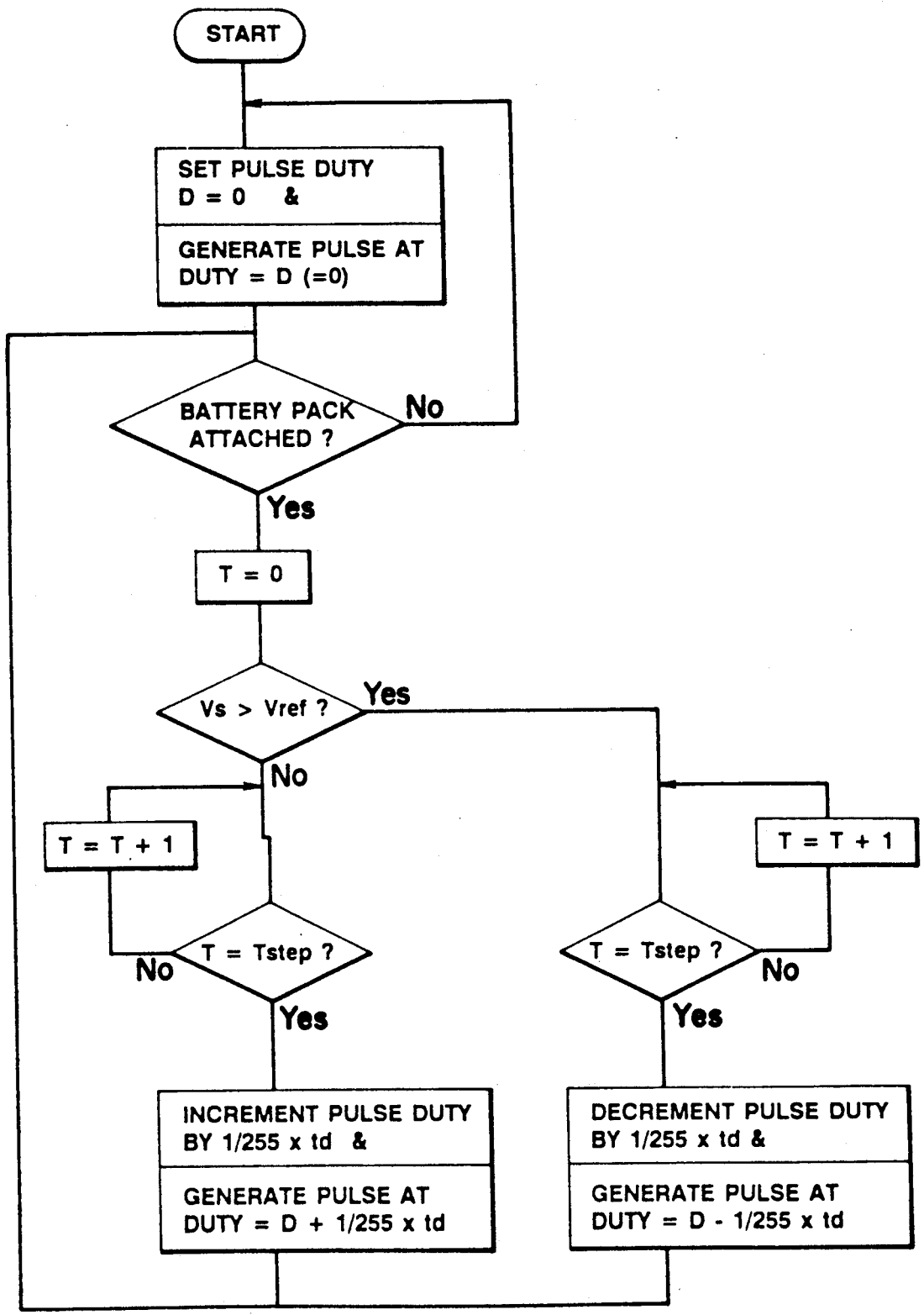
FIG. 5 is a flow chart illustrating the operation of the present invention.
Figure 8:
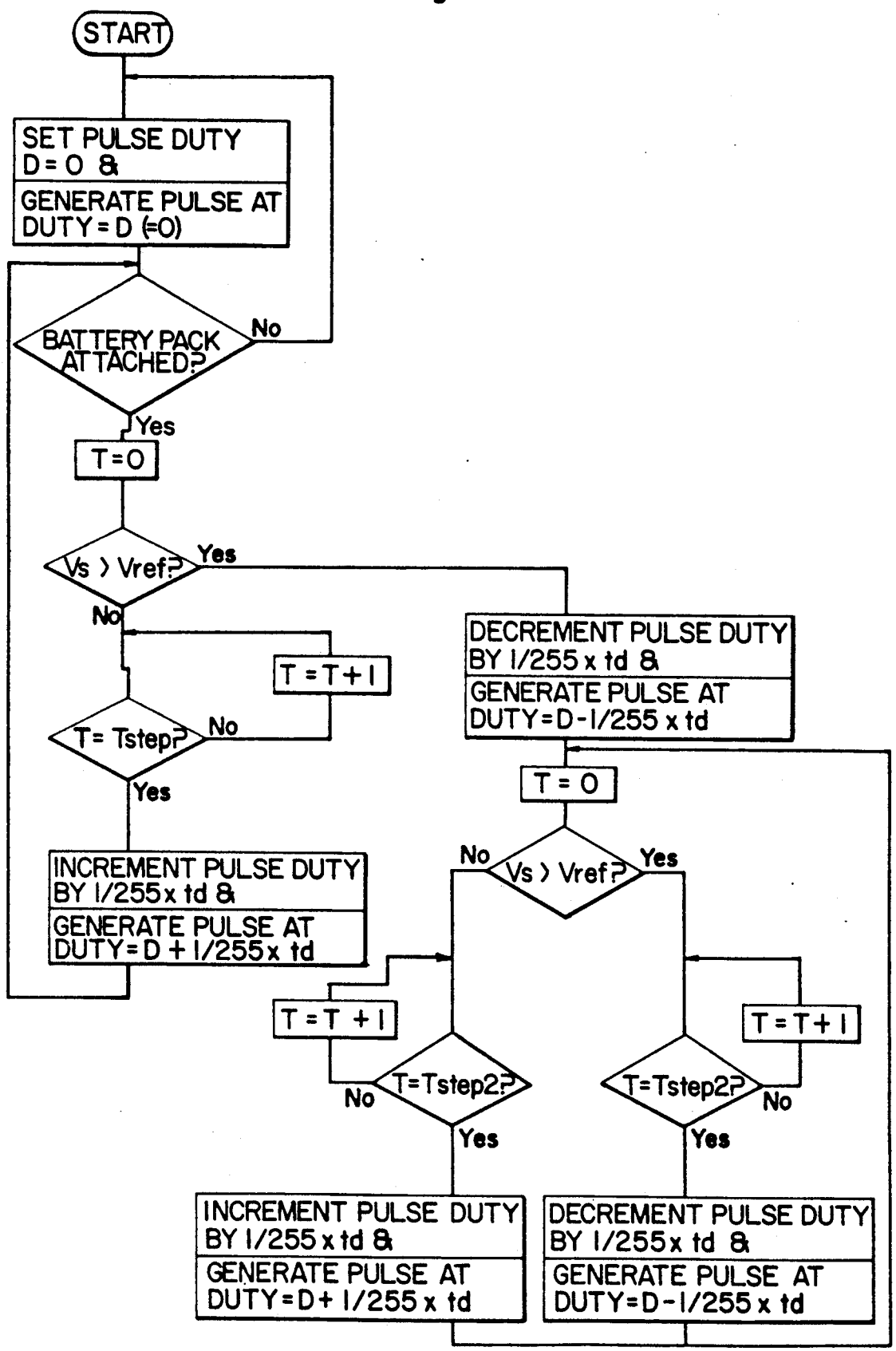
FIG. 8 is a flow chart illustrating the operation of a modification of the above embodiment.

Referring to a flow chart of FIG. 8, a modification of the above embodiment is seen which is characterized in that, once the sensed charge current reaches the reference level ($V_s > V_{ref}$), the feedback controller responds to shorten a period of time from $T_{step}$ to $T_{step2}$ during both of which the feedback pulses of the same width repeat. Other operations are identical to those of the above embodiment as illustrated in FIG. 5. Upon sensing the charge current exceeding the reference level ($V_s > V_{ref}$), the pulse duty D (pulse width) is lowered by a decrement of $1/255 \times td$ so that the feedback pulses having thus decremented duty are repeated for the shortened time period $T_{step2}$. Thereafter, the feedback pulses are controlled to repeat for such shortened time period $T_{step2}$ so as to increase response sensitivity. Also in this loop, the charge current or the corresponding voltage $V_s$ is constantly compared to the reference level $V_{ref}$ to increase and decrease the pulse width by $1/255 \times td$ in order to maintain the charge current level substantially at the reference level. In this manner, it is possible to increase response sensitivity of the charging circuit after the charge current is increased to the reference level, whereby stabilizing to generate the constant charge current with reduced ripples. The reduced ripple in the output charge current is preferable to reduce the size of a capacitor utilized in the output circuit.

What is claimed is:

1. A circuit for supplying a constant DC current to a load comprising:
    a DC voltage source for generating a DC voltage;
    an inverter to generate an AC voltage from said DC voltage, said inverter being connected to said DC voltage source, said inverter including switching means for repetitively interrupting the supply of said DC voltage to generate said AC voltage, said switching means being controlled by a control signal, said switching means having an on-off time ratio, said AC voltage being proportional to said on-off time ratio;
    an AC to DC converter connected to said inverter, said AC to DC converter rectifying and smoothing said AC voltage and for providing a DC current to be supplied to the load;
    current sensing means for sensing said DC current being supplied to the load and for generating a sensed signal corresponding to said DC current;
    comparator means for comparing a level of said sensed signal with a predetermined reference level to generate a first output signal when the level of the sensed signal is below said reference level and to generate a second output signal when the level of said sensed signal exceeds said reference level; and
    control means including a feedback controller, an integrator circuit and a PWM controller, said control means being responsive to said first and second output signals,
    said feedback controller providing a first feedback control signal and a second feedback control signal, said first feedback control signal being a train of first pulses, said first pulses having an increasing duty ratio, said second feedback control signal being a train of second pulses, said second pulses having a decreasing duty ratio,
    said feedback controller generating said first feedback control signal in response to said first output signal from said comparator means and generating said second feedback control signal in response to said second output signal from said comparator means,
    said integrator circuit integrating said first feedback control signal into a first analog signal and integrating said second feedback control signal into a second analog signal, said first analog signal having an increasing level, said second analog signal having a decreasing level,
    said PWM controller being connected to said integrator circuit to receive said first and second analog signals and to generate said control signal, said control signal to drive said switching circuit at a varying on-off time ratio, said varying on-off time ratio being a function of said first and second analog signals,
    wherein said first feedback control signal and second feedback control signal comprises at least a first and a second unit, respectively, each of said units comprising at least two pulses, each pulse of said unit having a predetermined pulse width, said pulse width of said first unit being a different width than the pulse width of said second unit, the width of each pulse in said first unit varying step wise from the width of each pulse in said second unit to vary the on-off time ratio of said switching means, said on-off time ratio of said switching means increasing and decreasing said DC current.

2. A circuit for supplying a constant DC voltage as in claim 1 wherein said feedback controller having at least a first time period and at least a second time period, said second time period being shorter than said first time period, said feedback controller generating said first feedback control signal during said first time period, each of the pulses of said first feedback control signal having the same pulse width, said first time period ending when said level of said sensed signal is equal to said reference level, said second time period beginning when the level of said sensed signal exceeds said reference level, said feedback controller generating said second feedback control signal during said second time period.

* * * * *